(No Model.)

T. LEACH.
FRUIT HOLDER.

No. 527,999.  Patented Oct. 23, 1894.

WITNESSES:
Fred G. Dieterich
Edw. M. Byrn.

INVENTOR
Thomas Leach.
BY Munn
ATTORNEYS.

UNITED STATES PATENT OFFICE.

THOMAS LEACH, OF TAUNTON, MASSACHUSETTS, ASSIGNOR TO THE REED & BARTON CORPORATION, OF SAME PLACE.

FRUIT-HOLDER.

SPECIFICATION forming part of Letters Patent No. 527,999, dated October 23, 1894.

Application filed April 4, 1894. Serial No. 506,332. (No model.)

*To all whom it may concern:*

Be it known that I, THOMAS LEACH, of Taunton, in the county of Bristol and State of Massachusetts, have invented a new and useful Improvement in Fruit-Holders, of which the following is a specification.

The object of my invention is to provide a neat and convenient individual holder for oranges, and other fruit, for the purpose of serving them more cleanly and daintily at the table.

It relates to that form of orange holder in which a cup is provided interiorly with engaging points which penetrate the skin of the orange, and hold it while being eaten with a spoon, and it consists in a receptacle for the orange having rigidly secured to its inner side walls vertical ribs, of a rigid form running convergently from the upper edge of the cup to the bottom and whose edges are wrought into sharp downwardly pointing ratchet teeth which permit the rounded surface of the orange to be forced downwardly between the same, and there caught and retained by the sharp teeth.

Figure 1:
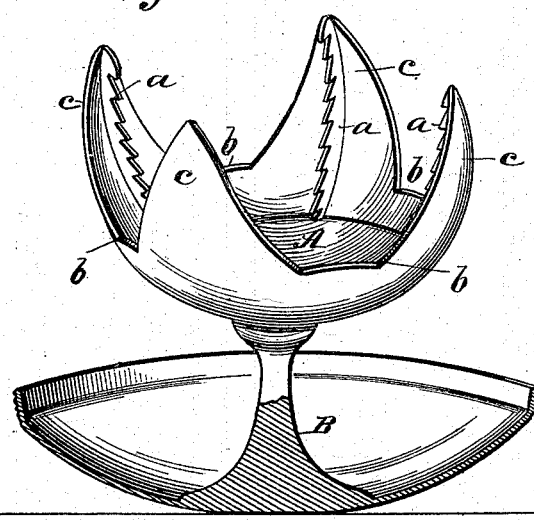
Figure 2:
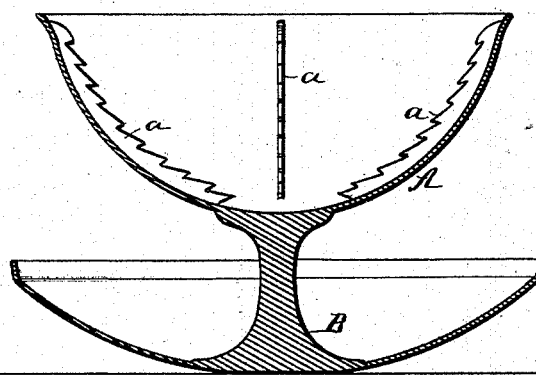

Figure 1 is a perspective view of my improved fruit holder partly in section. Fig. 2 is a sectional view of a modification of the same.

A represents the receptacle for the orange which is usually cut in half crosswise its cells, and one half inserted in the receptacle with the skin portion at the bottom, and the cut face at the top. This receptacle is rigidly mounted upon a base B which has raised outer edges to form a dish or saucer shaped receptacle for seed, skin, or juice that may overflow. This base has a rounded or convex bottom to facilitate tilting or turning the holder when in use. This base, however, forms no part of my invention, and any other form of base may be substituted therefor.

The receptacle A for the fruit is provided on the inner face of its side walls with four, more or less, vertical ribs $a$ which extend from the top to the bottom and project edgewise into the receptacle. These ribs have formed on their edges sharp downwardly pointing ratchet teeth which, when an orange is pressed down between the same, penetrate the skin, and becoming embedded therein, firmly hold the orange against either dislodgement or turning in the holder. These receptacles are preferably formed with spaces cut away at points $b$ between tapered, triangular, or foliated segments $c$ bearing the toothed ribs, which ribs reinforce and strengthen these segments against bending. This form of the receptacle permits a large portion of the skin of the orange to show, and facilitates its removal from the holder after the pulp or flesh has been removed, and also gives a graceful and light appearance to the holder. I do not, however, confine my invention to this form of holder, as the receptacle for the orange may be made cup shaped as shown in Fig. 2, and with either a plain or scalloped rim.

In constructing the holder, I may make it of various sizes according to the size of the fruit or other product which it is intended to hold. When made in large sizes it forms an excellent holder for cheeses, such as Edam and pineapple cheeses, or for cantaloupe, melons or other large fruit, and I propose to so use it.

I am aware that it is not new to construct an orange holder with a cup and downwardly projecting prongs that penetrate the skin of the orange and hold it firm, and I do not claim such construction broadly, but limit my invention to the cup provided with rigid vertical ribs $a$ having a series of downwardly pointing ratchet teeth extending along their entire length. These ribs not only adapt the holder to receive and hold oranges of different sizes without any spring action, but they add great strength to the cup, so that it may be constructed in a scalloped or foliated form as in Fig. 1 without danger of having the projecting parts bent or broken, the ribs forming a reinforce for the same.

Having thus described my invention, what I claim as new, and desire to secure by Letters Patent, is—

The fruit holder herein described, consisting of a receptacle for fruit having in its inner walls rigid vertical ribs $a$ extending from the top to the bottom and having a series of downwardly projecting ratchet teeth formed along their entire length substantially as and for the purpose described.

THOMAS LEACH.

Witnesses:
GEO. E. CHAMBERS,
THEO. R. HALL.